3,157,576
VACCINE FOR ALEUTIAN DISEASE (HYPERGAM-
MAGLOBULINEMIA) IN MINK
James D. Russell, Madison, Wis., and Edward C. Muehl-
felt, Cary, Ill., assignors to American Scientific Labora-
tories, Inc., a corporation of Wisconsin
No Drawing. Filed May 10, 1962, Ser. No. 193,854
11 Claims. (Cl. 167—78)

This invention relates generally to vaccines and to methods for preparing the same. More particularly, this invention relates to a vaccine for the prophylactic treatment of Aleutian disease in mink, and to methods for preparing the same from tissues of animals affected with the agent causing Aleutian disease, and from tissue culture systems containing the agent causing Aleutian disease.

Aleutian disease (hypergammaglobulinemia) has been recognized as a serious disease affecting mink for the past decade. It is characterized in affected animals by loss of weight, incomplete digestion of foodstuffs and dark or tarry feces. The affected mink are extremely thirsty, about 10 to 25 percent of those animals which are visibly sick bleed at the mouth, and their blood clotting time is often increased. As the disease progresses, the mink become increasingly thinner until death intervenes. Mink affected with this disease may die within two weeks or they may linger for three months or more before dying. Mink showing the more chronic disease form are susceptible to secondary infections, such as pneumonia, and they may often die after a sudden drop in temperature in the fall. The disease is most prevalent in mink homozygous for the Aleutian gene, but other color phases and types of mink are also susceptible.

Patholigicaly, kidney lesions are the most significant finding upon postmortem examination, although the spleen and liver are also comomnly involved. In early phases of the disease, the kidneys may appear enlarged, reddened, swollen with small hemorrhages, whereas in later stages, the kidneys are pale, shrunken, yellowish and pitted with striations appearing in the cortex. The spleen is usually enlarged with dark circumscribed areas on the surfaces and the lymph follicles appear more pronounced. The liver may be mottled and a more yellowish brown than normal, with evidences of fatty metamorphosis also commonly present.

Histopathologic findings consist primarily of interstitial nephritis, and degeneration, inflammation, and necrosis of the liver. There is a marked inflammation of the blood vessels, particularly the arterioles of all tissues of the body. The disease begins with plasma cell infiltration and proliferation in the bone marrow, spleen and lymph nodes. Infiltrations of plasma cells then appear in the liver and kidneys and then, in the final stage, infiltration of practically all organs occurs. Infiltration of the tissues surrounding the blood vessels with plasma cells is considered diagnostic. As presently recognized in the art, this disease is manifested in the form of a hypersensitivity reaction or an autoimmune phenomenon. Until the recent development of a rapid diagnostic test for this disease in mink, called the iodine agglutination test, the only way of detecting the disease in its early stages was by postmortem examination. Aleutian disease is, at the present time, the most serious disease affecting the commercial mink industry.

Prior to the present invention, there existed no effective method of treatment or prevention of Aleutian disease in mink. It is, therefore, a primary object of the present invention to provide a safe and effective vaccine which has the ability of immunizing and protecting mink against Aleutian disease when the animals are exposed to the causative agent of such disease.

It is a further object of our invention to provide a safe and effective vaccine which has the ability of arresting the progression of the disease in mink affected with the disease causing agent.

It is a still further object of our invention to provide an effective method of producing a vaccine having the properties set forth in the above stated objects.

Other objects and advantages will be readily apparent from the following detailed description:

Prior to the original impetus for the rationale and development of the persent vaccine, there existed no known cause of Aleutian disease. However, quite surprisingly, it was discovered by us that the disease could be transmitted by the transfer of affected tissues from affected mink to unaffected mink. Continued effort to determine the cause of this phenomenon has led to the present invention.

In accordance with the present invention, the above objects may be realized by preparing a vaccine suspension of tissues of affected animals, and by processing such vaccine by various physical and chemical procedures which will be more fully described as the description progresses, so as to render the resultitng tissue suspensions safe for use. Such treatment does not destroy the immunizing potential of the suspension and the vaccine is capable of protecting mink against the disease.

One preferred procedure for the preparation of vaccine is as follows: The internal organs from affected mink are homogenized in an aqueous medium so that a very fine suspension of the tissue results. The tissue suspension is then filtered through graded porosities of metal screen and/or cheese cloth to further remove particulate matter and produce an amorphous homogenous mass. Any suitable equipment known to the art may be used for the purpose of grinding and filtering the tissue suspension. The resulting tissue suspension may or may not be further diluted in an aqueous medium prior to inactivation. It has not been shown that the concentration of tissue in the vaccine is critical and it may vary over a wide range and still be effective as an immunizing agent. Specifically, tisue suspensions ranging from about 10% tissue to about 40% tissue have been found particularly effective and generally satisfactory to apply.

Another preferred procedure for the preparation of the vaccine involves the propagation and growth of the agents causing Aleutian disease in mink in other media such as tissue culture systems. With the use of such tissue culture systems, large amounts of vaccine may be prepared from one tissue source inoculated with the disease causing agent.

The tissue suspensions prepared by one of the above procedures, or by any other type of vaccine preparation procedure, are treated with any of a variety of chemical and/or physical inactivating agents such as formaldehyde, betapropiolactone, phenol, heat, ultraviolet irradiation or other substances, physical agents or methods for inactivating disease causing agents which are commonly known to the vaccine preparing art. The tissue suspension is maintained in contact with the inactivating agent for a sufficient period of time, and under proper physical conditions, to assure the complete inactivation of the disease causative agent.

An adjuvant such as aluminum hydroxide gel, potassium alum, mineral oil emulsions or any other adjuvant known to the art may be added to the tissue suspension. If such an adjuvant is added, such addition may be accomplished either prior to or after the inactivation procedure. Such adjuvants known to the art prolong the period of absorption of the antigenic material in the vaccine and enhance its effectiveness.

The inactivated tissue suspension may additionally be treated with a germicidal agent to destroy any remaining microorganisms present therein. Such a germicidal agent may consist of one or more of the above mentioned chemical inactivating agents, or may include one or more other suitable agents or processes known to the art.

Various preservative agents such as, for example, merthiolate, benzethonium chloride or antibiotics may be added to the finished vaccine to prevent multiplication of any microorganisms present therein.

The finished vaccine must not contain living Aleutian disease producing agents. The vaccine is also sterile in all other respects, that is, it contains no living bacteria, yeasts or molds.

Our novel vaccine, when prepared in accordance with the foregoing description, will produce an immunity in mink injected therewith against infection with live positive agents of Aleutian disease. In addition, when the vaccine is injected into mink suffering from Aleutian disease, it will tend to arrest the progression of the disease, and prolong the life of the vaccinated mink.

Normally, the finished vaccine is administered to mink by subcutaneous injection; however other routes, such as intraperitoneal, intramuscular, intradermal or other recognized methods of administering an inactivated vaccine may be used. Furthermore, it is not intended that this invention be limited to use as a single vaccine only, but that combinations of inactivated vaccines may be prepared. In fact, combinations may be produced in the same animal, using the same tissues and procedures for preparing a multi-purpose vaccine such as, for example, mink enteritis vaccine and Aleutian disease vaccine.

The following examples of the preparation and administering of our novel vaccine are for purposes of exemplification only, and in no way limit the scope of the invention as described and claimed.

EXAMPLE 1

The livers, spleens, and kidneys taken from mink affected with Aleutian disease were homogenized in a colloid mill and made into a 20% tissue suspension, with distilled water as the aqueous suspending medium. This suspension was then passed through graded porosity stainless steel screens from 20 mesh to 80 mesh. The filtering process removed most particulate tissue material so that the resulting suspension was extremely fine. The suspension was then inactivated with 0.5% commercial formalin for one week (168 hours) at room temperature.

The raw material was checked for the absence of bacterial contamination and was free of other viral diseases of mink such as distemper and mink virus enteritis as determined by animal inoculation. The material was also checked for general safety and absence of toxic substances by the intraperitoneal injection of mice. Each of 20 mink was inoculated subcutaneously with two ml. of this vaccine preparation. Twenty additional mink were inoculated intraperitoneally with 5 ml. of the non-inactivated tissue suspension, and 20 healthy mink of the same source and type were left as untreated controls.

Three months later, five mink from each group were sacrificed and examined for pathological and histopathological lesions of Aleutian disease. The results are given in Table I, wherein it is seen that all of those mink injected with the non-inactivated tissue suspension were affected with Aleutian disease, and none of the five mink vaccinated with the inactivated tissue suspension were affected with the disease.

*Table I*

PRELIMINARY INACTIVATION AND VACCINE EVALUATION

| Treatment | No. of Mink | Safety Test (3 Mo. Postvac. affected/tested [1]) | No. of Mink challenged | Immunity Status | | Total |
|---|---|---|---|---|---|---|
| | | | | Weeks Postchallenge (affected/challenged) | | |
| | | | | 4 Weeks | 6 Weeks | |
| None—Controls | 20 | 0/5 | 10 | 5/5 | 5/5 | 10/10 |
| | | | 5 | (not challenged) | | 0/5 |
| Formalized Tissue Suspension (2 ml. Subcutaneous Inoc.) | 20 | 0/5 | 15 | 3/5 | 3/10 | 6/15 |
| Non-treated Tissue Suspension (5 ml. Intraperitoneal Inoc.) | 20 | 5/5 | | No further tests—group infected. | | |

[1] Based on histopathology.

This experiment demonstrated the infectivity of the original material and the safety of the inactivated material. These resuls show that: (1) Aleutian disease can be transmitted to mink not previously affected with the disease by injecting such mink with a suspension of tissue taken from affected mink; (2) Aleutian disease is infectious in nature; (3) Aleutian disease is probably caused by a filterable agent which is smaller than ordinary bacteria.

The remaining 15 vaccinated animals, and ten of the unvaccinated controls, were then challenged with 5 ml. of the non-inactivated 20% tissue suspension. Four weeks post-challenge, five animals from each group were sacrificed and examined for pathological and histopathological lesions of Aleutian disease. Six weeks post-challenge, the remaining vaccinates and controls were blood tested and sacrificed, and pathological observations were made. These results are also given in Table I. It is seen that all ten of the unvaccinated challenged controls were affected with Aleutian disease. On the other hand, only six of the 15 vaccinated challenged mink were found to have Aleutian disease. Of the six affected vaccinated mink, only one was as severely affected as the unvaccinated and challenged controls. It is believed that 5 ml. of untreated infected tissue is a much more severe challenge than would ever occur in nature. Also, the animals were challenged three months after vaccination, which places a heavy burden on the protective capacity of the vaccine.

This example shows that animals inoculated with a properly prepared vaccine do not develop Aleutian disease. Furthermore, 60% of the vaccinated mink completely resisted a very severe challenge three months after vaccination. If one also considers partial resistance, then 93% of the animals possessed an apparent degree of resistance imparted by the use of the vaccine.

EXAMPLE 2

Vaccines from affected tissues were prepared as in Example 1, except that a 15% suspension of kidney and spleen only was used instead of a 20% suspension of liver, spleen and kidney. Formalin concentration for inactivation was 0.6%, readjusted to 0.5% after seven days incubation at 23 to 26° centigrade. Forty mink free of infection were selected for vaccination. Ten mink were inoculated with one ml. each of the formalized vaccine subcutaneously; ten additional mink were given 2 one ml. inoculations one week apart; and ten mink were given two ml. each subcutaneously. Five additional mink were given one ml. of the non-inactivated infectious material intraperitoneally, and five mink were left as untreated contact controls.

Fifteen days after the last inoculation, mink receiving the 2 one ml. inoculations and those which were inoculated with the raw tissue and the five controls were blood tested with the iodine agglutination test. The results are given in Table II.

*Table II*

ALEUTIAN DISEASE VACCINE EVALUATION

| Treatment | Safety Status,[1] (Affected/Tested) | | Immunity Status,[1] 2 wks. Post-challenge[2] (Affected/Challenged) | Total Protected by AD Vaccine |
|---|---|---|---|---|
| | 3 wks. Postvac. | 5 wks. Postvac. | | |
| AD Vaccine (One 1 ml. Subcutaneous Inoc.) | No test | 0/5 | 1/5 | 4/5 |
| AD Vaccine (Two 1 ml. Subcutaneous Inoc.) (1 week interval) | 0/10 | 0/5 | 1/5 | 4/5 |
| AD Vaccine (One 2 ml. Subcutaneous Inoc.) | No test | 0/5 | 0/5 | 5/5 |
| Control—No Treatment | 0/5 | 0/5 | 5/5 | 0/5 |
| AD Tissue (One 1 ml. Intraperitoneal Inoc. Non-inactivated) | 5/5 | No test | No test | |

[1] Based on iodine agglutination test for Aleutian disease.
[2] Two ml. of non-inactivated AD tissue inoculated intraperitoneally.

One day following the blood test, five of the formalized tissue vaccine treated animals from each group and the five previously untreated were challenged with two ml. of the raw and untreated infectious tissued suspension intraperitoneally. Two weeks following this challenge, all the mink were again blood tested. Results are also included in Table II.

These results show that only one mink which received one ml. of vaccine, and one which received 2 one ml. inoculations of the formalized vaccine were susceptible to the challenge, and none of the five mink which received the two ml. inoculations were affected by the challenge. Challenge virulence was shown in that 100% infection occurred in the unvaccinated challenged controls. Vaccination therefor gave 100% protection to the mink receiving a two ml. inoculation, and 80% protection was afforded mink receiving either one mil, or two 1 ml. inoculations. This gives a total overall protection of 87%. Three groups of vaccinated but unchallenged mink remained free of infection, further demonstrating the safety of the formalized vaccine.

The above results clearly illustrate the effectiveness of our novel prophylactic vaccine. The number of mink which may be saved for pelting each year by the mink industry through use of our vaccine to prevent contraction of and arrest of the progression of Aleutian disease in mink is enormous. It may reasonably be expected that widespread use of our vaccine will eventually result in substantial elimination of Aleutian disease as a threat to the mink industry.

It is understood that the present invention is not limited to the particular embodiments or methods herein described, but embraces all such modified forms thereof as may come within the scope of the following claims.

We claim:

1. A composition for use as a vaccine in the treatment of mink, said composition comprising:
   (a) an aqueous suspension medium,
   (b) a quantity of finely divided tissues obtained from animals affected with agents causing Aleutian disease in mink,
   (c) said tissues being suspended in said liquid suspension medium,
   (d) said Aleutian disease causing agents in said suspended animal tissue having been inactivated.

2. The composition described in claim 1 wherein said tissue suspension is between about 10% and about 40% tissue.

3. The composition described in claim 1 wherein said animal tissue is selected from at least one of the group of internal tissues consisting of kidney, spleen, liver, brain, lung, lymph node, and bone marrow.

4. The composition described in claim 1 wherein said vaccine includes an inactivating agent dissolved in said suspension medium whereby to inactivate the Aleutian disease causing agents in said suspended animal tissue.

5. A composition for use as a vaccine in the treatment of mink, said composition comprising:
   (a) a liquid tissue culture medium,
   (b) Aleutian disease causing agents suspended and grown in said liquid tissue culture medium,
   (c) said Aleutian disease causing agents having been inactivated.

6. In a process for preparing a vaccine for use in the treatment of mink, the steps of:
   (a) homogenizing a quantity of tissue taken from animals affected with agents causing Aleutian disease in mink,
   (b) suspending said homogenized tissue in an aqueous suspension medium,
   (c) inactivating the Aleutian disease causing agents in said suspended tissue.

7. In the process described in claim 6 the additional step of filtering said tissue suspension to remove any particles of excessive size.

8. The process described in claim 6 wherein said aqueous suspension medium is sterile prior to the suspension therein of said homogenized tissue.

9. The process described in claim 6 wherein said tissue suspension is between about 10% and about 40% tissue.

10. The process described in claim 6 wherein said animal tissue is selected from at least one of the group of internal tissues consisting of kidney, spleen, liver, brain, lung, lymph node and bone marrow.

11. In a process for preparing a vaccine for use in the treatment of mink, the steps of:
   (a) propagating and growing agents causing Aleutian disease in mink in a tissue culture media,
   (b) inactivating said Aleutian disease causing agents in said tissue culture.

References Cited in the file of this patent

Henson et al., "Hypergammaglobulinemia in Mink," P.S.E.B.M., 107 (4), pp. 919–920 (1961).